United States Patent [19]
Ball

[11] 3,956,737
[45] May 11, 1976

[54] MEMORY SYSTEM WITH PARALLEL ACCESS TO MULTI-WORD BLOCKS

[76] Inventor: Roger James Ball, 10 Radnormere Drive, Cheadle Hume, Cheshire, England

[22] Filed: July 12, 1974

[21] Appl. No.: 488,201

[30] Foreign Application Priority Data
July 19, 1973 United Kingdom............... 34428/73

[52] U.S. Cl. ........................................... 340/172.5
[51] Int. Cl.[2]........................................ G06F 9/08
[58] Field of Search ............................... 340/172.5

[56] References Cited
UNITED STATES PATENTS

| | | | |
|---|---|---|---|
| 3,588,829 | 6/1971 | Boland et al...................... | 340/172.5 |
| 3,618,040 | 11/1971 | Iwamoto et al................. | 340/172.5 |
| 3,618,041 | 11/1971 | Horikoshi......................... | 340/172.5 |
| 3,638,199 | 1/1972 | Kolankowsky.................... | 340/172.5 |

*Primary Examiner*—David H. Malzahn

[57] ABSTRACT

A stream of data words is written into a memory, organised on the basis of multi-word blocks, by collecting consecutively occurring words having the same block address and transferring those words to the memory in parallel, only when a word with a new block address appears. This reduces the number of memory accesses required and hence permits faster operation.

4 Claims, 1 Drawing Figure

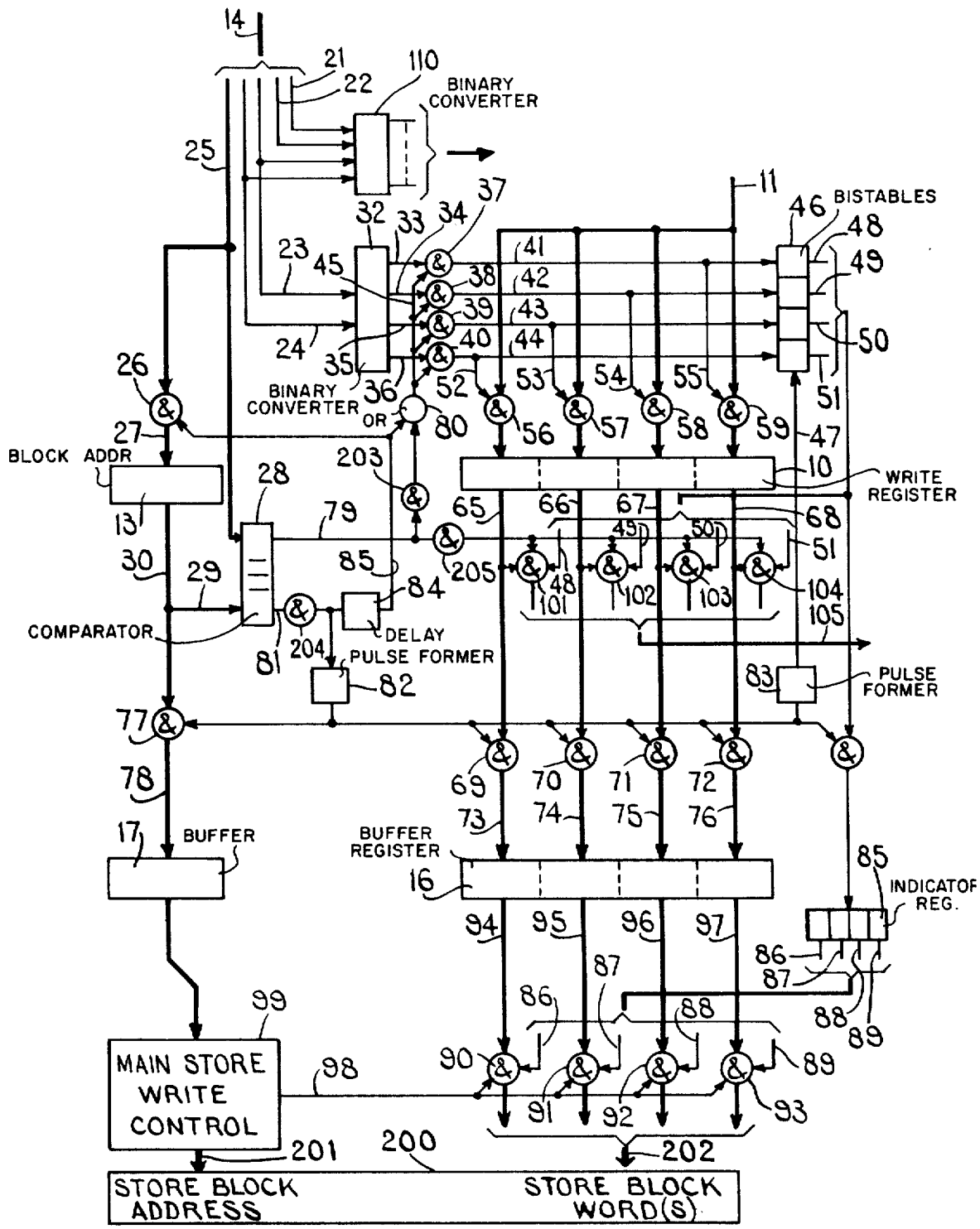

MEMORY SYSTEM WITH PARALLEL ACCESS TO MULTI-WORD BLOCKS

BACKGROUND OF THE INVENTION

The invention relates to memory arrangements for data processing apparatus.

Data processing speed is heavily dependent on the time required to obtain information that is stored in the memory for control and processing purposes. The cost of the memory is dependent on both the required speed of operation and the storage capacity, so that it is most expensive to provide a large capacity store with a very high speed of access. One solution to this problem is to employ a hierarchical memory system for which the stores at different levels have different speeds with the largest stores having the slowest speeds, the higher speed stores being arranged to hold information which is currently in use, or is likely to be required for use in the near future. In such a system, whenever an item of information in a higher speed store is updated, it may be arranged that a corresponding item of information in a lower speed store is also updated, so as to maintain identical copies of the item in both stores. This permits the higher speed store to be overwritten at any time, to replace an item of information in it which is no longer in current use with a new item, without having first to write back the former item into the lower speed store. However, this has the disadvantage that, every time an item of information is updated, an access must be made to the lower speed store, thus tending to reduce the speed of operation of the apparatus.

SUMMARY OF THE INVENTION

According to the invention, a memory arrangement for data processing apparatus comprises a memory holding a plurality of multi-word blocks of information, each block being individually addressable to permit writing to all the words in that block in parallel, means for receiving a stream of data words for writing into the memory, each data word having a block address identifying which block of the memory it is to be written into, and means for collecting consecutively occurring words having the same block address and transferring those words in parallel to the memory only when a word having a different block address occurs.

It will be seen that the invention will, in general, reduce the number of accesses which have to be made to the memory, since it is to be expected that successive words will frequently be required to be written into the same multi-word block of the memory. As will be shown, the invention is particularly useful in a hierarchical memory system of the kind described above, for reducing the number of accesses which have to be made to the lower speed store for updating information.

Conveniently, the word collection means comprises a first register containing a plurality of word locations equal to the number of words in a multi-word block, a block address register, comparator for testing for a match between the block address of the current data word in the stream and the contents of the block address register, means responsive to a match indication from the comparator for writing the current data word into the first register, and means responsive to a mismatch indication from the comparator for initiating application of the contents of the first register and the block address register to the memory and then writing the current data word into the first register and its block address into the block address register. Preferably, the contents of the first register and the block address register are applied to the memory by way of respective buffer registers, so that the actual updating of the memory can be delayed until some convenient point of time.

In a preferred form of the invention, the arrangement also includes an indicator register, for storing an indication of which word locations of the first register have been written into, the contents of this indicator register being used to selectively gate the contents of the first register to permit only the contents of those word locations of the first register which have been written into to be applied to the memory.

BRIEF DESCRIPTION OF THE DRAWING

One embodiment of the invention will now be described by way of example with reference to the single FIGURE of the accompanying drawing, which is a schematic block diagram of a memory arrangement for a data processing apparatus.

DESCRIPTION OF THE PREFERRED EMBODIMENT

Referring to the drawing, the memory arrangement includes a main store unit 200, which is organised in four-word blocks. Each block is individually addressable, by means of a block address applied to the store over an address path 201. Up to four data words can be written in parallel into the addressed block, over a data path 202. Blocks of words may also be read in parallel from the store 200.

In the drawing, four registers are shown: a write register 10 fed over a multi-line cable 11 with a stream of data words for writing into the main store 200; an address register 13 fed over multi line cable 14 with addresses identifying the locations in the main store 200 into which the data words are to be written; and two buffer registers 16 and 17 similar to the registers 10 and 13, respectively, and serving to accept the contents thereof when required. The write register 10 and the corresponding buffer register 16 each have four-word capacities corresponding to the four-word blocks in which the main store 200 is organised.

The cable 11 will have one line for each bit of one word. It is also assumed that the words have four bytes each, with eight bits per byte, a byte representing the smallest quantity of information which can be individually addressed within the machine. The least significant two bits of each address (lines 21, 22 of cable 14) are treated as identifying a particular byte within a 4-byte word with the next two bits (lines 23, 24) identifying a word within a 4-word block. The remaining lines, 25, represent the block address and are fed to a set of AND gates 26 whose outputs 27 comprise inputs to the address register 13, and also to a comparator circuit 28 which also receives the contents of the block address register 13 overlines 29 from the output 30 thereof.

The word identifying bits on lines 23 and 24 are fed to a binary to one-out-of-four converter 32 having four output lines 33 to 36 one of which will be energised depending on the states of the input lines 23 and 24 and will represent the corresponding word within the block concerned. The word - representative lines 33 to 36 comprise first inputs of four AND gates 37 to 40, respectively, and their states determine those of the AND gate outputs 41 to 44 when the line 45 is energised to enable the AND gates 37 to 40. The AND gate outputs 41 to 44 control the settings of a group 46 of four bistable devices resettable together on energisation of line 47. The set outputs 48 to 51 of the group 46 thus represent, by their state of energisation, whether or not corresponding ones of their input lines 41 to 44 have been energised since the group 46 was last reset.

The lines 41 to 44 are also connected via branch lines 52 to 55, respectively, to energise respective sets 56 to 59 of AND gates via which an input word on lines 11 can reach any one of the word sections of the register 10 depending on which AND gate set is enabled.

The word sections of the write register 10 have their outputs 65 to 68 connected via AND gate sets 69 to 72, respectively, to inputs 73 to 76 of corresponding word sections of the write buffer register 16. In a similar manner the outputs 30 of the address register 13 are connected via AND gates 77 to inputs 78 of the address buffer register 17.

In operation, the address register 13 contains the block address of a four word block of the main store 200 and the write register 10 contains a word or words which it is required to write into that block. The next word to be written into the store appears on lines 11 together with its full address on lines 14. The block address part on lines 25 is fed to the comparator 28 which already receives the contents of the address register 13 over lines 29. If the comparator 28 finds a match, its output 79 is energised thereby enabling the AND gates 37 to 40 via an AND gate 203 (which is enabled only during write operations), an OR gate 80, and the enabling line 45. At this time, the word identifying lines 23, 24 will, via the converter 32, cause one of the lines 33 to 36 to be energised so that the corresponding one of the AND gates 37 to 40 will have its output energised, thereby energising one of the lines 52 to 55. The corresponding one of the AND gate sets 56 to 59 will therefore be enabled to pass the input word on lines 11 to the appropriate word section of the write register 10. The energised one of the lines 41 to 44 will also set the corresponding one of the bistable devices 46.

If the comparator 48 does not find a match when the input word and its address are presented on lines 11 and 14, its mismatch output 81 will be energised. This output is applied via an AND gate 204 (which is enabled only for write operations) to a pulse former 82 so as to cause AND gates 69 to 72 in the outputs of the write register 10 and AND gate 77 in the output of the address register 13 to be enabled thereby causing the contents of the registers 10 and 13 to be transferred to the buffer register 16 and 17, respectively.

A block address will thus be held in the address register 13 from the time that input word having that block address is first gated into the write register 10 until input word appears having a different block address. Thus, words having the same block address will, if they appear consecutively, collect in the appropriate sections of the register 10. As soon as an input word relating to another block appears on the lines 11, the contents of the registers 10 and 13 will be gated into the corresponding buffer registers 16 and 17 ready for a write operation to the memory system.

To ensure that only those sections of the buffer register 16 that contain input words are written to main store, the states of the lines 48 to 51 are also gated by the output of the pulse former 82 to a register 85 such as a set of bistable devices similar to that referenced 46.

The latter, i.e. the bistable devices 46 are reset together by a pulse former 83 responsive to the trailing edge of a pulse from the pulse former 82 to supply the reset line 47. The register 85 has outputs 86 to 89 corresponding to lines 48 to 51 and these outputs partially control the enabling of AND gates 90 to 93 in the outputs 94 to 97 of the word sections of the buffer register 16. Completion of enablement of the AND gates 90 to 93 is via a line 98 energised at an appropriate time in a memory write cycle by store write control 99 also responsive to the block address in the other buffer register 17.

The line 81 is connected to a delay element 84 whose delay exceeds the combined width of the pulses from the pulse formers 82 and 83. The actions of the pulse former 83 and the delay 84 could, of course, be achieved by AND gates and appropriately timed enabling signals therefor. The delay element 84 produces an output on line 85 that, via the OR gate 80, also enables the AND gates 37 to 40, thereby causing the input word on the lines 11 to be gated into the register 10 and the corresponding block address to be gated into the register 13.

In summary, the apparatus described so far performs the functions of collecting successive input data words in the register 10 for as long as they refer to the same block of four words, and updating the main store 200 according to the contents of the buffer register 16 as soon as convenient thereafter.

The data and addresses on cables 11 and 25 may be applied to the apparatus from a processing unit (not shown) which may have associated with it a slave store (also not shown) of smaller size but having a faster access time than the main store 200. The slave store may be of conventional form and will not be described in detail here. Briefly, however, the slave store is intended to hold a relatively small number of words which are in current use by the processing unit so that these can be accessed rapidly by the processing unit without reference to the main store. The contents of the slave store are managed by a suitable replacement algorithm, which overwrites words which are no longer in current use with new words (copied from main store) which are, or are likely to be, in current use.

The processing unit may, from time to time, write data into the slave store so as to update words contained in that store. In the present system, whenever a word in the slave store is updated, its counterpart in the main store is also updated, so as to maintain identical copies of the word in both the slave store and the main store. Thus, the slave store may be overwritten with new words at any time without having first to write the replaced word back into the main store, since an up-to-date copy of the replaced word will already exist in main store (or at least will be in the process of being written into main store by way of the write register 10 and buffer 16).

This procedure of updating the main store every time a word in the slave store is updated would, in a conventional system, be expected to lead to an excessive number of accesses to the relatively slow main store, with consequent delays in processing. However, the apparatus shown in the FIGURE considerably alleviates these difficulties. Thus, because consecutively occurring words having the same block address are collected in the write register 10 and then transferred to the main store 200 in parallel, as a block, the number of store accesses required will, in general, be considerably reduced. Moreover, there is no necessity for synchronism between the updating of the slave store and the updating of the main store. Thus, when the processing unit updates a word, it does not have to wait for the updating to be completed in main store, and can proceed with its subsequent processing as soon as the word is updated in the slave store.

The main store 200 may also be accessible by a second processing unit, which does not have access to the same slave store as the first-mentioned processing unit. This can lead to problems, since the second processing unit may attempt to read a word from main store which contains out-of-date information, as a result of the delay between the first processing unit updating its slave store and the updated word being written into main store. In the present system, this problem is overcome by providing that the second processing unit should, before reading any word from the main store, consult the contents of the block address register via the comparator 28 to determine if data is in the process of being written into the main store to update that word. This is achieved by applying the address of the block from which it is required to read to the cable 14 and at the same time enabling an AND gate 205 in the "match" output path 79 of the comparator 28. If the block address matches the contents of the block address register 13, a signal will be applied, via AND gate 205, to four sets of AND gates 101 to 104 which are fed by branch lines from the outputs 65 to 68, respectively, of the write register 10. This partially enables those AND gate sets 101 to 104, and enablement is completed for any modified word resident in the register 10, as determined by the outputs 48 to 51 of the bistable devices 46 which are extended to corresponding ones of those AND gates as shown.

There will be outputs from any one of the AND gate sets 101 to 104 only if the corresponding word has been modified and the appropriate output is readily gated in as a replacement for the word read from main store, say using the output lines 48 to 51 again to enable AND gate sets in the lines 105.

As has been mentioned, the specific type of machine under consideration is byte oriented i.e. it is possible to address individual bytes if required for operations where words and word boundaries are not involved, such as so-called string operations. Embodiments of the invention are equally appliable in such operations using a binary to one-out-of sixteen converters 110 operative on the four least significant lines 21 to 24 of the full address cable 14. The outputs of the converter 110 can be used to set appropriate ones of a set of byte flag marker devices in a similar manner to the way the outputs 41 to 44 of the converter are used to set the devices 46 in word operation. A second set of such markers associated with the buffer register 16 and gates on its outputs allows the same type of collection then updating when convenient as described above for word operation. Similar arrangements will also be provided for sub sets of the AND gates 101 to 104 to cope with the possibility of reading information from main store that should have been updated but has not been yet because it is still possible that other information in the same block may require updating.

I claim:

1. A memory arrangement for data processing apparatus, comprising:
    memory means for holding a plurality of multi-word blocks of information, each block being individually addressable to permit writing to all the words in that block in parallel;
    first input means for receiving a stream of data words for writing into the memory means;
    second intput means for receiving with each said data word a block address identifying which block of the memory means that data word is to be written into;
    register means for holding a plurality of data words;
    first gating means for gating consecutively received data words from said first input means into said register means;
    means connected to said second input means for detecting changes in the received block address and producing a change indication signal upon detection of such a change; and
    second gating means responsive to said change indication signal for gating the data words in said register means in parallel to said memory means.

2. An arrangement according to claim 1 wherein said means for detecting changes in the received block address comprises:
    a block address register;
    comparater means connected to the block address register and to said second input means, for performing a comparison between each received block address and the contents of the block address register, and producing a said change indication signal when the comparison indicates inequality; and
    third gating means responsive to said change indication signal for gating said block address from said second input means into said block address register.

3. An arrangement according to claim 2 further including:
    third input means for receiving, with each said data word, a word address identifying which location in the data block that data word is to be written into;
    and wherein said register means comprises a plurality of word locations equal to the number of words in a said data block;
    and wherein said first gating means comprises a plurality of gates, responsive to said word address, for gating said data word into the word location of the register means corresponding to said word address.

4. An arrangement according to claim 3 further including:
    an indicator register;
    means responsive to gating of a data word into the register means, for storing in the indicator register an indication of which location of the register means that word was gated into: and
    further gating means responsive to the contents of the indicator register to permit only the contents of those locations of the register means in respect of which a said indication has been stored to be gated to the memory means.

* * * * *